United States Patent
Bunge et al.

(10) Patent No.: US 12,392,325 B2
(45) Date of Patent: Aug. 19, 2025

(54) METHOD FOR PARAMETERIZING A SENSOR ARRANGEMENT COMPRISING MULTIPLE LOAD SENSORS OF A ROTOR BLADE OF A WIND POWER INSTALLATION

(71) Applicant: Wobben Properties GmbH, Aurich (DE)

(72) Inventors: Frank Bunge, Ludwigshafen (DE); Stephan Kretschmer, Fitzbek (DE)

(73) Assignee: Wobben Properties GmbH, Aurich (DE)

( * ) Notice: Subject to any disclaimer, the term of this patent is extended or adjusted under 35 U.S.C. 154(b) by 50 days.

(21) Appl. No.: 18/339,683

(22) Filed: Jun. 22, 2023

(65) Prior Publication Data

US 2023/0417222 A1 Dec. 28, 2023

(30) Foreign Application Priority Data

Jun. 23, 2022 (EP) .................................. 22180742

(51) Int. Cl.
*F03D 17/00* (2016.01)
*G01L 5/12* (2006.01)

(52) U.S. Cl.
CPC ............... *F03D 17/00* (2016.05); *G01L 5/12* (2013.01); *F05B 2260/83* (2013.01)

(58) Field of Classification Search
CPC .... F03D 17/006; F03D 17/025; F03D 17/011; G01L 5/12
See application file for complete search history.

(56) References Cited

U.S. PATENT DOCUMENTS

| 8,255,173 B2 * | 8/2012 | Fujioka ................. F03D 17/00 290/55 |
| 2017/0292501 A1 | 10/2017 | Perley et al. |
| 2019/0010923 A1 | 1/2019 | Dua et al. |

FOREIGN PATENT DOCUMENTS

| EP | 2 431 607 A1 | 3/2012 |
| EP | 3 141 746 A1 | 3/2017 |
| EP | 3 317 513 B1 | 9/2021 |

* cited by examiner

*Primary Examiner* — Courtney D Heinle
*Assistant Examiner* — John S Hunter, Jr.
(74) *Attorney, Agent, or Firm* — Seed IP Law Group LLP

(57) ABSTRACT

A method for parameterizing a sensor arrangement comprising multiple load sensors of a rotor blade of a rotor of a wind power installation for acquiring at least one load variable, which is representative of a load that acts on the rotor blade, wherein the rotor blade has at least three load sensors, each of the load sensors records a load-dependent physical variable of the rotor blade and outputs a variable representative thereof as the acquired sensor variable, for calculating the at least one load variable from the sensor variables, at least one overall calculation rule is used, forming a relationship between the acquired sensor variables of all the load sensors and the at least one load variable of the rotor blade, and having multiple calculation parameters, and, for parameterizing the sensor arrangement, the calculation parameters of the overall calculation rule are determined while at the same time taking into consideration acquired sensor variables of all the load sensors.

20 Claims, 3 Drawing Sheets

METHOD FOR PARAMETERIZING A SENSOR ARRANGEMENT COMPRISING MULTIPLE LOAD SENSORS OF A ROTOR BLADE OF A WIND POWER INSTALLATION

BACKGROUND

Technical Field

The invention relates to a method for parameterizing a sensor arrangement comprising a plurality of load sensors of a rotor blade of a rotor of a wind power installation. The invention is likewise directed to a corresponding wind power installation in which such a method is implemented.

Description of the Related Art

By rotation of the rotor, wind power installations generate electrical power from wind. The rotor, in particular the rotor blades, are thereby exposed to great stresses on account of the wind. For example, it is subject to lifting forces, which may vary dependent on the wind speed, wind direction, alignment of the rotor and blade angle of the rotor blades.

For dependable operation, it is advisable to determine the stresses in order to be able to react in time if the stresses become too great. The wind power installation can then continue to be operated with reduced rotational speed and power output or if necessary be shut down. Recorded stresses can however also be used to derive estimates of likely lifetimes.

Particularly in the case of wind power installations with individual blade adjustment, in which the rotor blades can be set individually in their blade angle, it is advisable to determine stresses occurring. Such wind power installations make it possible to set the rotor blade individually during a rotation of the rotor and to set the rotor blade optimally at all times for maximizing power output in accordance with the wind direction. The rotor blades may in this case experience individual stresses.

Since the stresses occurring can act from different directions, it is usual to measure the stress on the rotor blades in at least two directions.

Known methods usually use four sensors for this. In this case, two sensors respectively form a sensor pair and two sensors of such a sensor pair are attached on opposite sides of the rotor blade. A disadvantage of this measuring method is that an exact alignment must be ensured when positioning the sensors. This makes attachment of the sensors more difficult and leads to measuring inaccuracies if positioning is performed incorrectly. Moreover, the use of four sensors per rotor blade leads to correspondingly high costs.

Methods for measuring stresses on rotor blades with three sensors are also known, such as for example in EP 3 317 513 B1.

According to EP 3 317 513 B1, the setting or calibrating of the sensors takes place individually. This has the disadvantage however that each setting or calibration must itself take place very accurately and at the same time details such as the sensor position must be known very exactly, or must additionally be accurately acquired. The method is consequently susceptible to errors.

BRIEF SUMMARY

Provided are one or more techniques according to which setting that is as exact as possible and susceptible to errors as little as possible is proposed for load sensors, as a prerequisite for using the load sensors. At least it is intended to propose an alternative to known methods.

Provided is a method of parameterizing a sensor arrangement comprising a plurality of load sensors of a rotor blade of a rotor of a wind power installation for acquiring at least one load variable.

The wind power installation consequently has a rotor with at least one rotor blade, in particular with three rotor blades.

Each rotor blade is equipped with a sensor arrangement comprising at least three load sensors. These are particularly arranged on the surface of the rotor blade in the region of the blade root. Here, the rotor blade has a substantially round circumference. In the case of three load sensors, they can ideally be arranged offset by about 1200 in relation to one another on the circumference, in order to be able to record loads in different directions.

It is also possible for a plurality of load sensors to be provided. A uniform distribution of the load sensors, such as the distribution by about 1200 in the case of three load sensors, should be aimed for, but slight deviations can be tolerated.

Each of the load sensors records a load-dependent physical variable of the rotor blade and outputs a variable representative thereof as the acquired sensor variable. Particularly, a load sensor may record a change in length as a physical variable of the rotor blade and in this respect output, for example proportionally, an electrical voltage amplitude as the sensor variable. Similarly, the sensor variable may simply be a preprocessed number that is proportional to the physical variable.

To stay with this example, the voltage output as the sensor variable is therefore representative of the recorded change in length. The change in length can be used to calculate or interpret a bending moment of the rotor blade. That is also possible here, but it is proposed to consider the sensor arrangement as a whole and also to take into consideration the sensor signals of the sensor arrangement together in order to calculate the bending moment.

For calculating the at least one load variable from the sensor variables, consequently at least one overall calculation rule is used, specifically in particular one for each load variable. The overall calculation rule forms a relationship between the acquired sensor variables of all the load sensors and the at least one load variable of the rotor blade. The overall calculation rule has for this purpose a plurality of calculation parameters. It is particularly envisaged to calculate two load variables, specifically two bending moments, respectively in different directions.

The load variable is consequently calculated according to the overall calculation rule. The individual recorded sensor variables are converted into the load variable directly on the basis of the overall calculation rule. The overall calculation rule consequently takes into consideration an overall relationship.

Depending on which load variable is to be determined, that is to say for example whether a flapwise bending moment or an edgewise bending moment is to be calculated, a different overall calculation rule can be used, or different calculation parameters can be used. It is however also possible to combine multiple overall calculation rules, but preferably a dedicated overall calculation rule is used for each load variable.

The overall calculation rule is based firstly on the theory that, for each sensor, an associated load component, that is to say for example a bending moment in the measuring direction of the sensor, can be individually calculated from the physical variable, that is to say for example the change in length, by corresponding parameter selection. In simplified terms, these calculations of the individual sensors are combined in the overall calculation rule, in order thereby also to take different measuring directions into consideration.

In fact, the calculation parameters cannot be assigned any longer to a ratio between load variable (bending moment) and recorded physical variable (change in length at the sensor) in the overall calculation rule, at least not quantitatively. Instead, all that matters for the overall calculation rule and its calculation parameters is that the load variable (bending moment in one direction) is calculated while taking into consideration the physical variables (changes in length) of all the load sensors altogether. The individual calculation parameters of this overall calculation rule are then no longer physically interpretable, for which reason they are referred to as calculation parameters.

The calculation parameters are therefore also dependent on the number and arrangement of the load sensors. If, to illustrate this by an example, a sensor is added to an existing sensor arrangement, the available calculation parameters must become less, because otherwise the added sensor would lead to a higher calculated load variable (or the added sensor would not have any influence).

For parameterizing the sensor arrangement, thus the calculation parameters of the overall calculation rule are determined while at the same time taking into consideration acquired sensor variables of all the load sensors.

The load sensors are consequently not set individually but together. Consequently, this overall calculation rule is parameterized in a way in which all that matters is the relationship between the many input variables, specifically the sensor variables, and the output variable, the load variable. Parameterizations of individual sensors are avoided. Consequently, details of the individual sensors, such as their exact arrangement, also no longer play any part, or at least only a more minor part than when they are considered individually.

In particular, it is proposed that the parameterization of the sensor arrangement, at least respectively of an overall calculation rule, takes place in one step, in particular in a calculation step. As a result, the calculation parameters of at least one overall calculation rule are consequently determined together in one step.

The parameterization may take place such that sensor variables of all the load sensors with different loads occurring are recorded and the calculation parameters are determined together on the basis of this dataset. For this purpose, for each set of sensor variables, a reference value for the load variable to be determined is calculated. The individual unknowns are then the calculation parameters. If a sufficiently great number of datasets are recorded, with respectively different loads, the calculation parameters can be calculated. This can take place by changing the overall calculation rule. A matrix notation is preferably used for this purpose.

The larger the dataset, the smaller the influence of statistical measuring deviations. A parameterization is nevertheless already possible when there are a small number of recorded load cases. However, at least as many load cases as there are calculation parameters, and consequently are to be determined, should be recorded for the determination.

According to a further aspect, no individual parameterization of individual load sensors takes place for determining the calculation parameters. In particular, no individual calibration or adjustment of individual load sensors takes place.

Consequently, what matters is not individual load sensors, in particular not some kind of individual parameterization or adjustment respectively of a sensor, because that can already take place at the manufacturers of the individual sensors prior to the application. What matters here is an overall relationship between a load variable and the sensor variables of all the sensors considered in this respect together. Even if each load sensor could be uniquely assigned a parameter in the overall calculation rule, even these calculation parameters are not determined individually. Instead, the calculation parameters are determined together, in order to parameterize the calculation rule in its entirety and in this way find the overall relationship.

According to a further aspect, the sensor variables are successively acquired in multiple acquisition steps in varying operational situations of the wind power installation. In each acquisition step, a sensor variable is in this case respectively acquired for each load sensor. Each acquisition step consequently acquires a plurality of sensor variables, specifically just as many as the sensor arrangement has load sensors. In this case, the sensor variables recorded in an acquisition step form a set of sensor variables.

Furthermore, in each acquisition step, at least one associated load variable is ascertained for the set of sensor variables as a reference load variable, specifically in particular one per overall calculation rule. In particular, the reference load variable is calculated. Furthermore, the acquisition steps are respectively repeated with a changed operational situation. In particular, at least as often as the overall calculation rule has calculation parameters to be determined, in particular at least once more often. The calculation parameters are then determined in dependence on all the sensor variables acquired in the acquisition steps and ascertained associated load variables.

After an acquisition step, therefore at least one acquired load variable is available as a reference load variable and a plurality of sensor variables, specifically one per sensor, that is to say a set of sensor variables with a reference load variable. The at least one associated load variable acquired as a reference load variable corresponds to the at least one load variable that should actually be determined from the sensor variables if the parameterization were completed, that is to say particularly a blade bending moment. Without this parameterization, and consequently for the parameterization, the blade bending moment, to stay with this example, must be determined in some other way. For example, the blade bending moment may be calculated from a known weight force, which acts on the rotor blade depending on its position, and varies depending on the position of the rotor blade. For each load variable that is to be determined with the sensor arrangement, an associated reference load variable is determined.

The overall calculation rule can then be presented for this one acquisition step as a mathematical equation in which the reference load variable and the sensor variables are known. If there were only one calculation parameter to be determined, the equation could be resolved on the basis of this. However, multiple calculation parameters are to be determined, and therefore, to stay with this illustration, multiple equations are to be set up. For this, the acquisition steps are repeated with changed operational situations.

The operational situations are in this case changed such that a changed blade bending moment, to stay with this example, is always obtained, because there is little sense in setting up the same equation twice. In mathematical terms, the equations that are obtained for each acquisition step or for each operational situation should be "linearly independent of one another."

If as many acquisition steps are carried out as the overall calculation rule has calculation parameters, a system of equations with a correspondingly high number of equations could be set up and uniquely resolved. If, however, more acquisition steps are carried out, an overdetermined system of equations can be set up.

Exactly that is the preferred variant, because as a result a solution with statistically the least deviation can be ascertained instead of a unique solution. It is assumed here that there may be statistical measurement deviations. Preferably, for this very many sets of sensor variables respectively with a reference load variable are recorded. Particularly, it is proposed to record at least twice as many, or even at least ten times as many, sets of sensor variables with a reference load variable as there are calculation parameters to be determined.

According to a further aspect, the overall calculation rule has a calculation equation, or the overall calculation rule is the calculation equation. The calculation equation describes by means of the calculation parameters a relationship between the load variable and the sensor variables.

For determining the calculation parameters, a system of equations comprising a plurality of calculation equations is set up. For each calculation equation of the calculation system, an ascertained reference load variable is used for the load variable. Furthermore, for each calculation equation of the system of equations, sensor variables associated with the ascertained reference load variable are used for the sensor variables.

The system of equations is resolved on the basis of the calculation parameters. In particular, more calculation equations are set up than the overall calculation rule has calculation parameters, so that the system of equations is overdetermined. In this case, the system of equations is resolved such that a statistically optimal solution is obtained.

The relationship between the load variable and the sensor variables is therefore given by the calculation equation in which the load variable depends on the sensor variables and calculation parameters. To express it graphically, if the ascertained sensor variables are inserted into the calculation equation which also contains the calculation parameters, the load variable to be calculated is obtained.

For this purpose, however, first the calculation parameters must be determined, for which purpose the system of equations comprising a plurality of calculation equations is set up. The calculation equations of this system of equations respectively differ only in the values of the sensor variables and the reference load variable that are respectively inserted into the equations. The calculation parameters are consequently the only unknown that each calculation equation has.

For determining the calculation parameters, the system of equations is then resolved on the basis of the calculation parameters. In particular, the system of equations may be written in matrix notation, so that the system of equations is resolved on the basis of a vector comprising calculation parameters. For this purpose, it is provided that there is a linear system of equations.

In order to be able to determine the calculation parameters, it is proposed in particular that the system of equations is overdetermined. Therefore, more calculation equations than there are calculation parameters are set up. Especially, the calculation equations are intended to differ on the basis of the reference load variable, in order to avoid identical equations.

A statistically optimal solution is particularly one in which the calculation parameters are chosen such that the sum of the amounts or the squares of the deviations between the reference load variable and the load variable that is respectively obtained from the associated sensor variables with the calculation equation and the chosen calculation parameters is minimal.

Such a statistically optimal solution in which the sum of the squares of the deviations is minimal can be achieved by methods still to be described below with the aid of the pseudoinverse.

According to a further aspect, the system of equations comprising a plurality of calculation equations of the overall calculation rule is set up in matrix form, with an output vector for the ascertained reference load variables, a measurement matrix for the acquired sensor variables and a parameter vector for the calculation parameters to be determined. The system of equations is set up such that the output vector is equal to a product of the measurement matrix times the parameter vector.

This is based on the idea that the load variable L can be obtained as the sum of the products $k_i \cdot x_i$ and the offset $k_0$, on the basis of the formula:

$$L = \sum_{i=1}^{n} k_i \cdot x_i + k_0.$$

Here, $k_i$ represents the parameters to be determined and $x_i$ the respectively recorded sensor variables, for the same sensor in each case. Supplementary explanations can be found further below. For the sake of simplicity, $k_0$ may also be assumed here to be zero. In matrix form, the following equation is obtained for both cases:

$$L = \vec{x}^T \cdot \vec{k},$$

In order to determine the parameters $k_i$ of the parameter vector $\vec{k}$, multiple such equations are set up and combined as follows in matrix form:

$$\vec{L} = A \cdot \vec{k}.$$

There is then a system of equations with multiple equations. In order to determine the parameters $k_i$ of the parameter vector $\vec{k}$, a measurement may be carried out for each equation in order to acquire the sensor variables $x_i$. However, the respective load variables L of the load variable vector $\vec{L}$ are not known. For the sake of simplicity, reference load variables $L_{ref}$, which respectively represent loads calculated from states of the installation, can be used in their place. They ideally correspond to the loads L ascertained from the sensor data, but in reality can have slight deviations. Particularly, the reference load variables do not include various real effects, such as wind influences, nonlinearities, noise and further effects. They may differ in this way from the loads to be ascertained. It is proposed to ignore these deviations.

With this simplification or approximation, the reference load vector can be used instead of the load variable vector $\vec{L}$ as the output vector $\vec{L}_{ref}$. Together with the parameter vector $\vec{k}$, and the measurement matrix A, the following system of equations can be set up in matrix form as an approximation:

$$\vec{L}_{ref} = A \cdot \vec{k}.$$

Here, the measurement matrix A has all the acquired sensor variables. The measurement matrix A consequently has at least as many columns as there are load sensors and as many rows as there are measured values that have been recorded per load sensor. For the set of sensor variables comprising the sensor variable $x_1$ of the first load sensor, the sensor variable $x_2$ of the second load sensor, and the sensor variable $x_3$ of the third load sensor, that is to say for a system with exactly three load sensors, the following is therefore obtained for the measurement matrix $$A = \begin{pmatrix} x_1(t=t_1) & x_2(t=t_1) & x_3(t=t_1) \\ x_1(t=t_2) & x_2(t=t_2) & x_3(t=t_3) \\ \ldots & \ldots & \ldots \\ x_1(t=t_p) & x_2(t=t_p) & x_3(t=t_p) \end{pmatrix},$$

if measuring has been carried out at the points in time $t_1$ to $t_p$, and consequently p sets of sensor variables have been recorded.

The reference load variable $L_{ref}$ has also been respectively determined for each set of sensor variables, so that the output vector likewise has as many rows as measurements were performed. The following is consequently obtained $$\vec{L} = \begin{pmatrix} L_{ref}(t=t_1) \\ L_{ref}(t=t_2) \\ \ldots \\ L_{ref}(t=t_p) \end{pmatrix}.$$

For parameterizing the sensor arrangement, the parameter vector $\vec{k}$ is to be determined, where $\vec{k}$ comprises the calculation parameters to be determined and consequently has at least as many rows as there are load sensors, in the case of three load sensors therefore $$\vec{k} = \begin{pmatrix} k_1 \\ k_2 \\ k_3 \end{pmatrix}.$$

For this purpose, an approximation solution for the system of equations is found by means of forming a pseudo-inverse of the measurement matrix. The following consequently applies:

$$\vec{k} = (A^T \cdot A)^{-1} \cdot A^T \cdot \vec{L}_{ref}.$$

This approach finds a solution in which an error between L and $L_{ref}$ is minimized.

By the use of the pseudoinverse, the calculation parameters are therefore determined in just one step and all the acquired sensor variables are taken into consideration at the same time in the determination. Moreover, by forming the pseudoinverse, the sum of the error squares of the acquired load variable is minimized. The method consequently becomes more robust the more measured values are recorded, that is to say the greater p becomes. In this case, the calculation remains computationally simple and can be quickly and easily resolved. It should be noted that the order of the inverse matrix is not dependent on the number of acquisition steps, but only on the number of calculation parameters to be determined. The order may therefore be 3 or 4, even if 100 measurements have been recorded. The inverse matrix can therefore be determined with little computational effort.

Alternatively or additionally, the parameter vector has an offset, and the measurement matrix has an additional column corresponding to the offset, which is filled with the value 1. In the multiplication of the measurement matrix by the parameter vector, the offset is therefore respectively multiplied by the value 1.

The parameter vector $\vec{k}$ is consequently obtained with the further offset $k_0$ as:

$$\vec{k} = \begin{pmatrix} k_1 \\ k_2 \\ k_3 \\ k_0 \end{pmatrix},$$

and also the measurement matrix has a further column filled with ones:

$$A = \begin{pmatrix} x_1(t=t_1) & x_2(t=t_1) & x_3(t=t_1) & 1 \\ x_1(t=t_2) & x_2(t=t_2) & x_3(t=t_3) & 1 \\ \ldots & \ldots & \ldots & 1 \\ x_1(t=t_p) & x_2(t=t_p) & x_3(t=t_p) & 1 \end{pmatrix}.$$

Alternatively or additionally, the measurement matrix has in addition to the sensor variables columns with powers of the sensor variables. The parameter vector has calculation parameters corresponding to this.

It is thereby further possible to take into consideration a non-linear influence of the sensor variables in addition to the linear consideration. The underlying overall calculation rule is in this case a polynomial function. Dependent on the degree of the polynomial, the measurement matrix is consequently supplemented by further columns. For each degree of the polynomial and each load sensor, the measurement matrix then has one column, plus an optional column for the offset. The number of columns therefore corresponds to the product of the degree of the polynomial and the number of load sensors, and optionally one column more. The number of calculation parameters of the parameter vector corresponds to the number of columns of the measurement matrix.

According to a further aspect, the calculation parameters comprise an offset $k_0$. Each load sensor is assigned at least one calculation parameter $k_i$. Furthermore, the overall calculation rule is obtained in that, for each of the load sensors, a product of the sensor variable $x_i$ of the respective load sensor i times the at least one calculation parameter $k_i$ associated with the load sensor is formed. The load variable L is obtained as the sum of the products $k t_i$ $x_i$ and the offset $k_0$ on the basis of the formula:

$$L = \sum_{i=1}^{n} k_i \cdot x_i + k_0.$$

The formula applies for n load sensors. In the case of three load sensors, the formula for the overall calculation rule is consequently obtained as:

$$L = k_1 \cdot x_1 + k_2 \cdot x_2 + k_3 \cdot x_3 + k_0,$$

Where the calculation parameter $k_1$ is assigned to the first load sensor with the sensor variable $x_1$. The same applies correspondingly for the further calculation parameters.

The sensor variable itself is proportional to the strain E of the respective load sensor. It is not necessary however for said strain to be determined as an intermediate variable.

In matrix notation, the load variable could also be described as:

$$L = \vec{x}^T \cdot \vec{k},$$

where the following applies:

$$\vec{x} = \begin{pmatrix} x_1 \\ x_2 \\ x_3 \\ 1 \end{pmatrix}, \text{ and } \vec{k} = \begin{pmatrix} k_1 \\ k_2 \\ k_3 \\ k_0 \end{pmatrix}.$$

According to a further aspect, for the successive acquisition of the sensor variables in varying operational situations, the operational situations are chosen such that different load variables, in particular different bending moments, occur at the rotor blade.

The bending moments in this case result from a dead weight of the rotor blade. They are varied by the rotor being changed in its rotational position. Alternatively or additionally, a blade angle of the rotor blade may also be changed.

The aim here is to produce as many different bending moments as possible at the rotor blade. In each measurement, that is to say in each recording of a set of sensor variables, preferably a different load, in particular a different bending moment, then acts on the rotor blade. Correspondingly, the calculated reference load variables also differ from one another of course, because they are calculated with knowledge of the changed operational situation. The calculation parameters can in this case be determined all the more accurately the further the measured values deviate from one another.

The load may also depend on ambient conditions, in particular on the wind. Preferably, the sensor variables are acquired with the weakest wind possible, so that the load is obtained by approximation just from the dead weight of the rotor blade.

For varying the load, it is then sufficient if the rotor blade continues to turn, because the weight force acts differently on the rotor blade depending on the rotor position. Ideally, the acquisition is carried out when the wind is so weak that the rotor only just keeps turning. By varying the blade angle, the load acting can additionally be varied.

When calculating the reference load variable, it must be remembered that the load sensors have their own coordinate system, which specifically lies in the rotor blade and changes with the blade angle. A corresponding transformation must therefore be taken into consideration in dependence on the blade angle. Particularly, the weight force can be transformed into the coordinate system of the load sensors for the calculation of the bending moment as a reference load variable.

According to a further aspect, for the successive acquisition of the sensor variables in varying operational situations in acquisition steps, a schedule is prescribed for the acquisition steps, so that the varying operational situations are set according to the schedule. The parameterizing of the sensor arrangement is carried out after ending of the schedule.

The schedule therefore allows it to be determined in advance which operational situations are set. This generates a routine which ensures as many different set operational situations as possible. Preferably, as a result the reference load variables, particularly the bending moments, are prescribed so as to be distributed uniformly over a prescribed range, which is preferably chosen to be as great as possible but still small enough that it can be achieved by using weight forces. Since all of the operational situations were set according to the schedule, a sufficiently large dataset of sets of sensor variables, including reference load variables, has been determined to ensure a good parameterization of the sensor arrangement.

According to a further aspect, for acquiring the sensor variables, at least one operational setting is provided from the list comprising: the wind power installation is operated in an idling mode, a blade angle of the rotor blade is set, a power output is set, a torque of a generator connected to the rotor is set, and a rotational speed of the rotor is set.

For acquiring the sensor variables, at least one of the operational settings is varied. In this case, each operational setting is retained for a predetermined test period. Preferably, each operational setting is retained for multiple acquisition steps.

Alternatively or additionally, at least one operational setting is retained until multiple operational situations are in each case enacted, with an acquisition step for acquiring the sensor variables being respectively carried out.

One operational situation that provides a basis for an acquisition step is in particular a rotor position with a set blade angle. A set generator torque and/or a set power output may be added. In idling mode, the rotor turns very slowly, and consequently the operational situation changes, specifically from one rotor position to the next, with fixed operational settings, that is to say set idling mode and set blade angle.

Thus, some operational situations may be enacted particularly over a full, a half or a quarter turn of the rotor, with some sets of sensor variables being recorded along with reference load variables. This can then be repeated with a changed blade angle. In particular, in idling mode, the rotor can still be turned. Then, some operational situations may again be enacted over a full, a half or a quarter turn of the rotor, and again with some sets of sensor variables being recorded along with reference load variables.

It is however also possible to vary multiple operational settings from the list together.

In idling mode, the rotor of the wind power installation turns, but the wind power installation does not feed any power into the grid. In particular, no power output is generated either. The rotor is therefore in a state in which it can be assumed that the stresses on the rotor blade are only caused by the dead weight of the rotor blade. Further stresses can consequently be ignored, which leads to a more accurate result. This applies in particular if the wind speed is low, and therefore aerodynamic stresses can be ignored. Typically, the blade angle in idling mode is set to a value in the range from approximately 500 to 700 or more; in particular, it is set to a value of over 600.

Nevertheless, even when power output is generated, the sensor arrangement can be parameterized. For this purpose, the power output and/or the torque of the rotor can then be set. Then, however, it is no longer possible to assume stressing solely as a result of the dead weight, so that it is necessary to take the loads additionally occurring into consideration in the reference load variable.

According to a further aspect, the acquisition of the sensor variables for parameterizing the sensor arrangement takes place at wind speeds in a first wind speed range and a second wind speed range. The first wind speed range lies between a start-up wind speed and a first wind speed, which is greater than the start-up wind speed. The second wind speed range lies between the first wind speed and a second wind speed, which is greater than the first wind speed. Furthermore, the acquisition is repeated at wind speeds in the first wind speed range if the acquisition previously took place at wind speeds in the second wind speed range.

Preferably, the sensor arrangement is accordingly parameterized when there are low wind speeds. In this case, the wind speed must merely be sufficient to turn the rotor, and consequently lie above the start-up wind speed. The start-up wind speed consequently refers to the wind speed that is sufficient to turn the rotor of the wind power installation without delivering power. It allows bearing friction of the rotor to be overcome.

If the wind speed exceeds the first wind speed, aerodynamic influences can no longer be ignored and must be taken into consideration in the calculation of the reference load variable. The first wind speed is accordingly chosen such that aerodynamic stresses can be ignored if the parameterization or the recording of measured values for it takes place at wind speeds up to the first wind speed.

Should parameterizing be required before such low wind speeds occur, the sensor arrangement may also be parameterized above the first wind speed. Then, the parameterizing is however repeated under better conditions, specifically when the wind speed is in the first wind speed range, in order to improve the result of the parameterization.

According to a further aspect, the first speed range is chosen in the range of a cut-in wind speed, from which the operation of the wind power installation is started. The cut-in wind speed in this case lies above the start-up wind speed. In particular, the first speed range lies between 30% and 200% of the cut-in wind speed, particularly preferably even between 50% and 150% of the cut-in wind speed, the speed range being chosen such that wind speeds below the start-up wind speed are avoided. The rotor is therefore turning.

Alternatively or additionally, the first speed range is chosen in the range from the start-up wind speed. The first speed range lies in particular between 100% and 250% of the start-up wind speed.

Alternatively or additionally, the first speed range lies between 1.5 m/s and 8 m/s and particularly preferably between 2 m/s and 6 m/s.

The cut-in wind speed refers to the wind speed at which the wind power installation is started, specifically generates and can feed in power. The cut-in wind speed consequently lies above the start-up wind speed, from which the rotor begins to turn but still does not generate any power. Both the cut-in wind speed and the start-up wind speed may be different for each wind power installation. Moreover, the cut-in wind speed and the start-up wind speed may also be dependent on weather conditions, such as for instance air density.

According to a further aspect, the sensor arrangement is set up for acquiring at least two load variables. A dedicated overall calculation rule with dedicated calculation parameters is provided for each load variable.

Once the sensor arrangement has been parameterized, consequently at least two load variables can be calculated with the sensor arrangement. Preferably an edgewise bending moment and a flapwise bending moment of the rotor blade.

According to a further aspect, one of the load variables is a blade bending moment of the rotor blade in a first direction, in particular in a flapwise direction, and one of the load variables is a blade bending moment of the rotor blade in a second direction, in particular in an edgewise direction. Optionally, one of the load variables is an axial force of the rotor blade. For each load variable, a dedicated overall calculation rule is used, with dedicated calculation parameters, in order to calculate the respective load variable from the sensor variables. The calculation parameters of each overall calculation rule are respectively determined while at the same time taking acquired sensor variables of all the load sensors into consideration, but preferably using the same acquired sensor variables. For determining the calculation parameters, a measurement matrix comprising acquired sensor variables for all the overall calculation rules together is recorded and used. Therefore, the same measurement matrix is used for each load variable. However, a dedicated output vector comprising ascertained reference load variables is used for each overall calculation rule, and consequently for each load variable.

If, therefore, a bending moment $M_x$ in a direction x, for example a flapwise direction of the rotor blade, is to be determined for example as load variable, for an example with three load sensors the formula of the overall calculation rule could be obtained as:

$$M_x = k_{x,1} \cdot x_1 + k_{x,2} \cdot x_2 + k_{x,3} \cdot x_3 + k_{x,0}.$$

For the same set of sensor variables, with adapted calculation parameters the bending moment $M_y$ in a second direction y, for example an edgewise direction of the rotor blade, could then be determined as:

$$M_y = k_{y,1} \cdot x_1 + k_{y,2} \cdot x_2 + k_{y,3} \cdot x_3 + k_{y,0}.$$

Optionally, the axial force that acts on the rotor blade can also be calculated, with adapted calculation parameters:

$$F_z = k_{z,1} \cdot x_1 + k_{z,2} \cdot x_2 + k_{z,3} \cdot x_3 + k_{z,0}.$$

The load variables, bending moment in a first direction x, bending moment in a second direction y, and axial force in a third direction z, are obtained with the same force acting, that is to say in the same operational situation. Therefore, the same dataset of sets of sensor variables, which can consequently be recorded in the same operational situations, can also be used in each case for determining the respective calculation parameters. Only the reference load variable has to be individually calculated for each load variable to be determined. This can however also take place for the same operational situations, with only the calculation of the reference load variables differing.

According to a further aspect, in each acquisition step the reference load variable is calculated in dependence on a gravitational force that is acting on the rotor blade for each load sensor. For this purpose, the gravitational force is converted into a coordinate system of the rotor blade. This takes place while taking into consideration a blade angle of the rotor blade, a rotational position of the rotor, an angle of inclination of the rotor with respect to a horizontal, and/or an angle of inclination of the rotor blade with respect to a rotational plane of the rotor.

The weight force can be calculated by using the known mass and mass distribution of the rotor blade. It has a different effect on the load variable according to the position of the rotor blade. In order to take that into consideration, the conversion of the weight force into the coordinate system of the rotor blade is proposed. Rotation matrices may be used for this purpose. The coordinate system of the rotor blade consequently relates to the region in which the load sensors are attached to the rotor blade.

According to a further aspect, for the successive acquisition of the sensor variables in varying operational situations in acquisition steps, the reference load variable is additionally ascertained in each acquisition step in dependence on aerodynamic forces occurring and/or aerodynamic moments occurring, which act on the rotor blade.

If the aerodynamic loads are also taken into consideration, this improves the result of the calculation of the reference load variables. The calculation parameters can consequently be determined even more accurately. This applies particularly if the wind speed lies above the first wind speed.

This also achieves the effect that sensor variables for operational situations in relation to which aerodynamic influences cannot be ignored can also be recorded for the parameterization.

According to a further aspect, a non-linear relationship between the sensor variables and the load variable is taken into consideration in that the calculation parameters comprise a or the offset $k_0$, altogether m calculation parameters $k_{i,j}$ are assigned to each load sensor, where m is greater than one, and the overall calculation rule in the case of n load sensors for the load variable L is obtained as:

$$L = \sum_{i=1}^{n}\left(\sum_{j=1}^{m} k_{i,j} \cdot x_i^j\right) + k_0.$$

The load variable is consequently calculated on the basis of a polynomial that allows higher powers of the sensor variables $x_i$.

In first approximation, for example a second-degree polynomial may be chosen, that is to say j=2, whereby the load variable is obtained as:

$L=k_{1,1}\cdot x_1+k_{1,2}\cdot x_1^2+k_{2,1}\cdot x_2+k_{2,2}\cdot x_2^2+k_{3,1}\cdot x_3+k_{3,2}\cdot x_3^2+k^0.$ If non-linearities are to be taken into consideration, this must also be taken into consideration in the calculation of the reference load variables.

In a matrix notation, a measurement matrix A could respectively have in each column the acquired sensor variables $x_i$ with a corresponding power, and in one column always the value one, which corresponds to the power 0.

Also provided is a wind power installation, with a sensor arrangement comprising multiple load sensors of a rotor blade of a rotor of the wind power installation for acquiring at least one load variable, which is representative of a load that acts on the rotor blade, the rotor blade having at least three load sensors. Each of the load sensors records a load-dependent physical variable of the rotor blade and outputs a variable representative thereof as the acquired sensor variable. The wind power installation also has a control device, in particular a parameterizing unit. The control device is set up to parameterize the sensor arrangement according to one of the aspects described.

For this purpose, the load sensors, which are particularly arranged on the rotor blade in the region of the blade root, are attached so as to be distributed over the circumference of the rotor blade. Preferably, three load sensors are attached, distributed at an angle of approximately 1200 in relation to one another around the circumference. However, this angle is not taken into consideration in the parameterization. Therefore, the load sensors can also be attached at a different angle in relation to one another, or be at a different distance from one another. It is also not necessary to know the angle. Consequently, inaccurate attachment of the load sensors does not lead to errors in the parameterization. This can be achieved by the calculation parameters of the overall calculation rule being determined for parameterizing the sensor arrangement while at the same time taking acquired sensor variables of all the load sensors into consideration. Therefore, no individual calibration of the individual sensors takes place.

In particular, the parameterization is implemented on the control unit according to one of the aspects described. Alternatively or additionally, a parameterizing unit on which the parameterization is implemented may also be provided for this purpose.

The control unit and/or parameterizing unit consequently sets different operational situations and/or operational settings, and carries out multiple acquisition steps, in particular according to a schedule that is stored in the control unit and/or parameterizing unit. Furthermore, sets of sensor variables are acquired and the calculation parameters are calculated and stored. The control unit and/or parameterizing unit may also be implemented in a process computer of the wind power installation.

DETAILED DESCRIPTION

Figure 1:
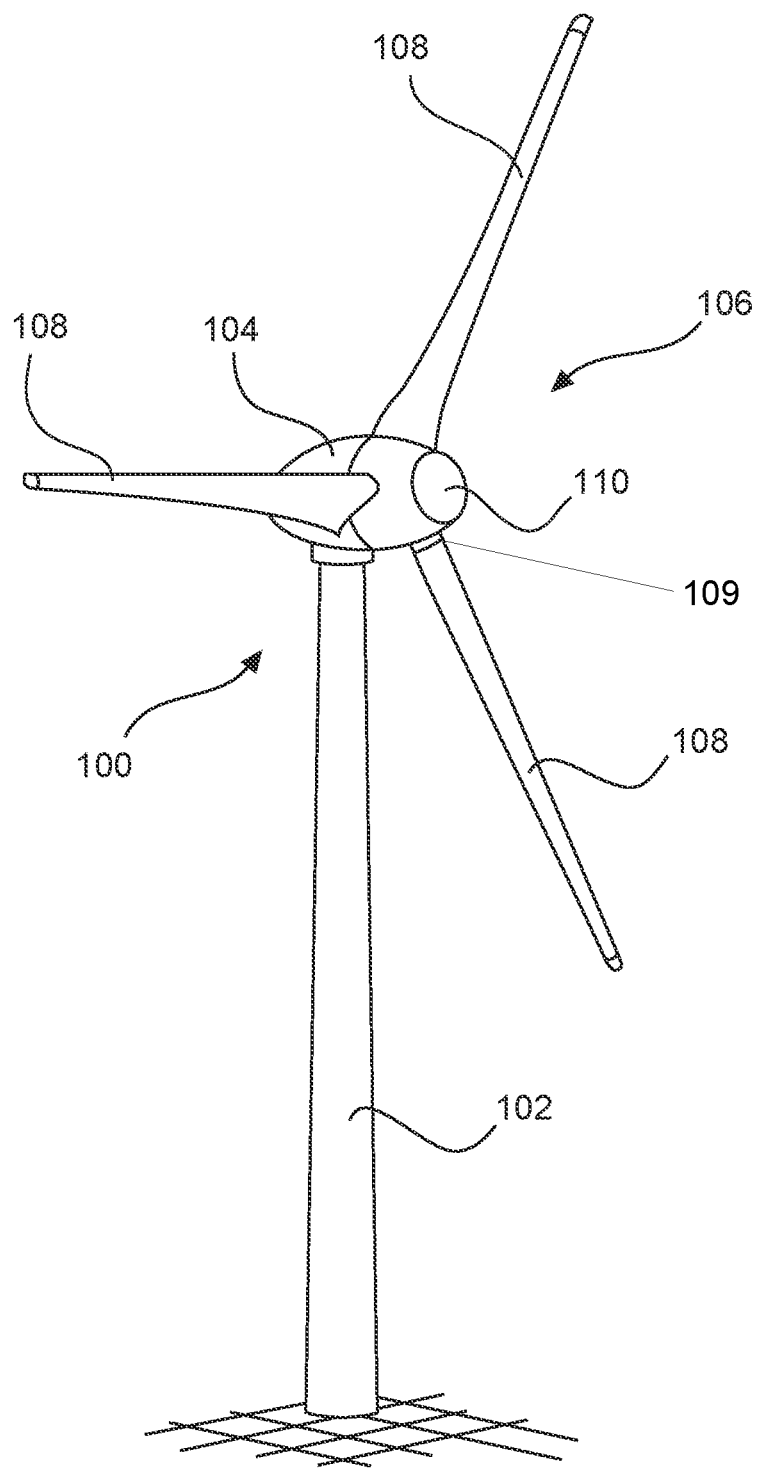
FIG. 1 shows a wind power installation in a perspective view.

FIG. 1 shows a schematic representation of a wind power installation according to the invention. The wind power installation 100 has a tower 102 and a nacelle 104 on the tower 102. Provided on the nacelle 104 is an aerodynamic rotor 106 with three rotor blades 108 and a spinner 110. During the operation of the wind power installation, the aerodynamic rotor 106 is set in a rotary motion by the wind, and thereby also turns an electrodynamic rotor of a generator that is directly or indirectly coupled to the aerodynamic rotor 106. The electrical generator is arranged in the nacelle 104 and generates electrical energy. The blade angles of the rotor blades 108, which may also be referred to synonymously as pitch angles, can be adjusted by pitch motors at the rotor blade roots 109 of the respective rotor blades 108.

Three load sensors are respectively arranged on each of the rotor blades 108.

Figure 2:
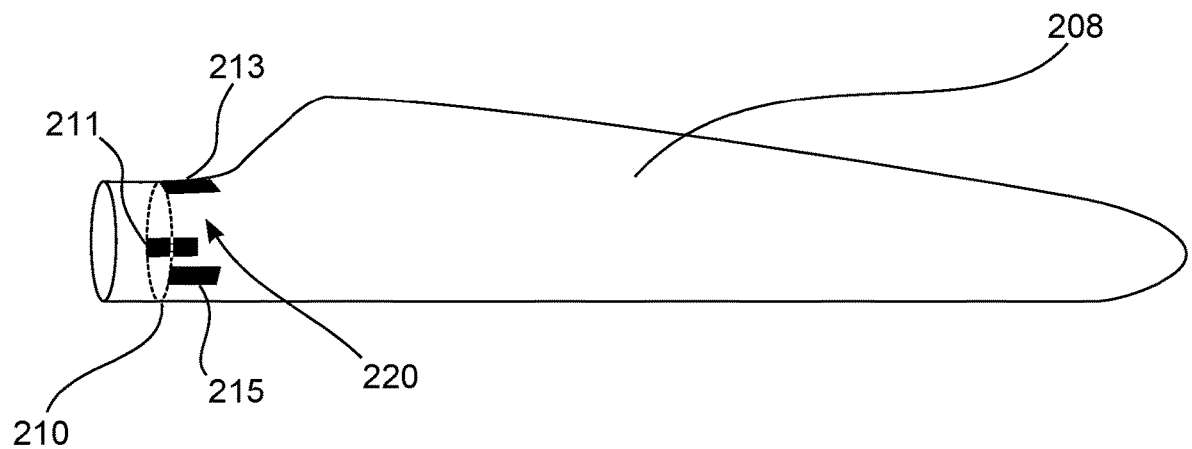
FIG. 2 shows a rotor blade with a sensor arrangement.

FIG. 2 shows a rotor blade 208 with a sensor arrangement 210. The sensor arrangement 210 has three load sensors 211, 213, 215. The sensor arrangement 210 is attached in the region of the blade root 220 of the rotor blade 208. In this case, the three load sensors 211, 213, 215 are distributed around the circumference of the rotor blade. Ideally, the load sensors 211, 213, 215 are offset in relation to one another by an angle of in each case 1200 around the circumference of the blade circumference. However, exact positioning does not matter.

Figure 3:
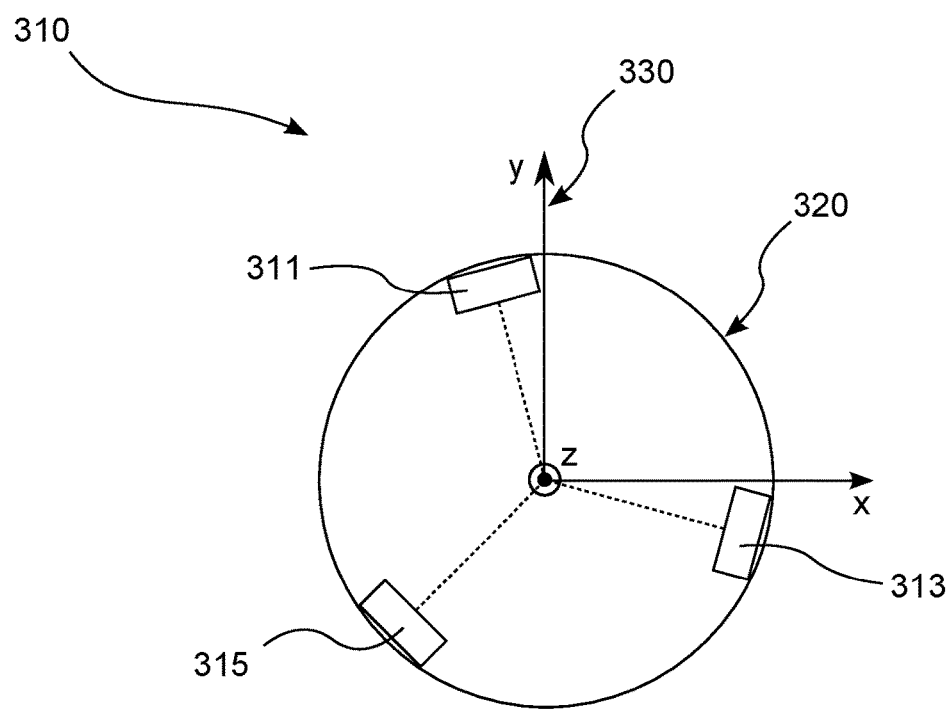
FIG. 3 shows a sensor arrangement.

FIG. 3 schematically shows the sensor arrangement 310 with three load sensors 311, 313, 315, which are distributed around the circumference of the rotor blade in the region of the blade root 320.

The three load sensors 311, 313, 315 therefore together form the sensor arrangement 310, which is set up for acquiring a load variable. In this case, the load variable should be determined in one of the spatial directions x, y, z of the coordinate system 320. The coordinate axis z in this case points into the figure and consequently corresponds to a direction in the longitudinal axis of the blade.

The load variable to be acquired may be for example a bending moment $M_x$ of the rotor blade in a flapwise direction x, a bending moment $M_y$ of the rotor blade in an edgewise direction y, or an axial force $F_z$ in a longitudinal direction z of the rotor blade. It is not required here that the measuring directions of the load sensors 311, 313, 315 lie along one of the coordinate axes x, y, z of the coordinate system 320.

If the rotor blade bends as a result of a load that is acting on the rotor blade, each of the load sensors 311, 313, 315 undergoes a change in length or strain. The physical variable of the change in length is acquired by the load sensors 311, 313, 315 in the form of a sensor variable representative thereof.

Therefore, if for example a bending moment $M_x$ acts in a flapwise direction x, each of the load sensors 311, 313, 315 undergoes a strain according to its position in the sensor arrangement 310, and acquires a sensor variable proportional to the strain.

In order to calculate the load variable from the sensor variables of the load sensors 311, 313, 315, the sensor arrangement 310 is parameterized.

An overall calculation rule is used as a basis for the parameterization of the sensor arrangement 310. The load variable can consequently be calculated on the basis of the overall calculation rule, which forms a relationship between the acquired sensor variables of the load sensors 311, 313, 315 and the load variable. In this case, the load variable can be determined directly from the measured sensor variables. It is therefore not necessary for the physical variable, specifically the strain, to be determined first.

The overall calculation rule has in this case multiple calculation parameters. Depending on which load variable is to be determined, different calculation parameters are used.

For the bending moment $M_x$ in the flapwise direction x, for example the overall calculation rule:

$$M_x = k_{x,1} \cdot x_1 + k_{x,2} \cdot x_2 + k_{x,3} \cdot x_3 + k_{x,0}$$

Is used, with the calculation parameters $k_{x,1}$, $k_{x,2}$, $k_{x,3}$, $k_{x,0}$, where $k_{x,0}$ forms an offset. The first load sensor 311 in this case measures the first sensor variable $x_1$, the second load sensor 313 measures the second sensor variable $x_2$ and the third load sensor 315 measures the third sensor variable $x_3$.

For the same set of sensor variables comprising sensor variables $x_1$, $x_2$, $x_3$, with the further calculation parameters $k_{y,1}$, $k_{y,2}$, $k_{y,3}$, $k_{y,0}$ the bending moment $M_y$ in the edgewise direction y can also be calculated according to:

$$M_y = k_{y,1} \cdot x_1 + k_{y,2} \cdot x_2 + k_{y,3} \cdot x_3 + k_{y,0}.$$

For the parameterization of the sensor arrangement 310, therefore the calculation parameters are determined.

The first, second and third sensor variables $x_1$, $x_2$ and $x_3$ are in this case the same for both bending moments.

Figure 4:
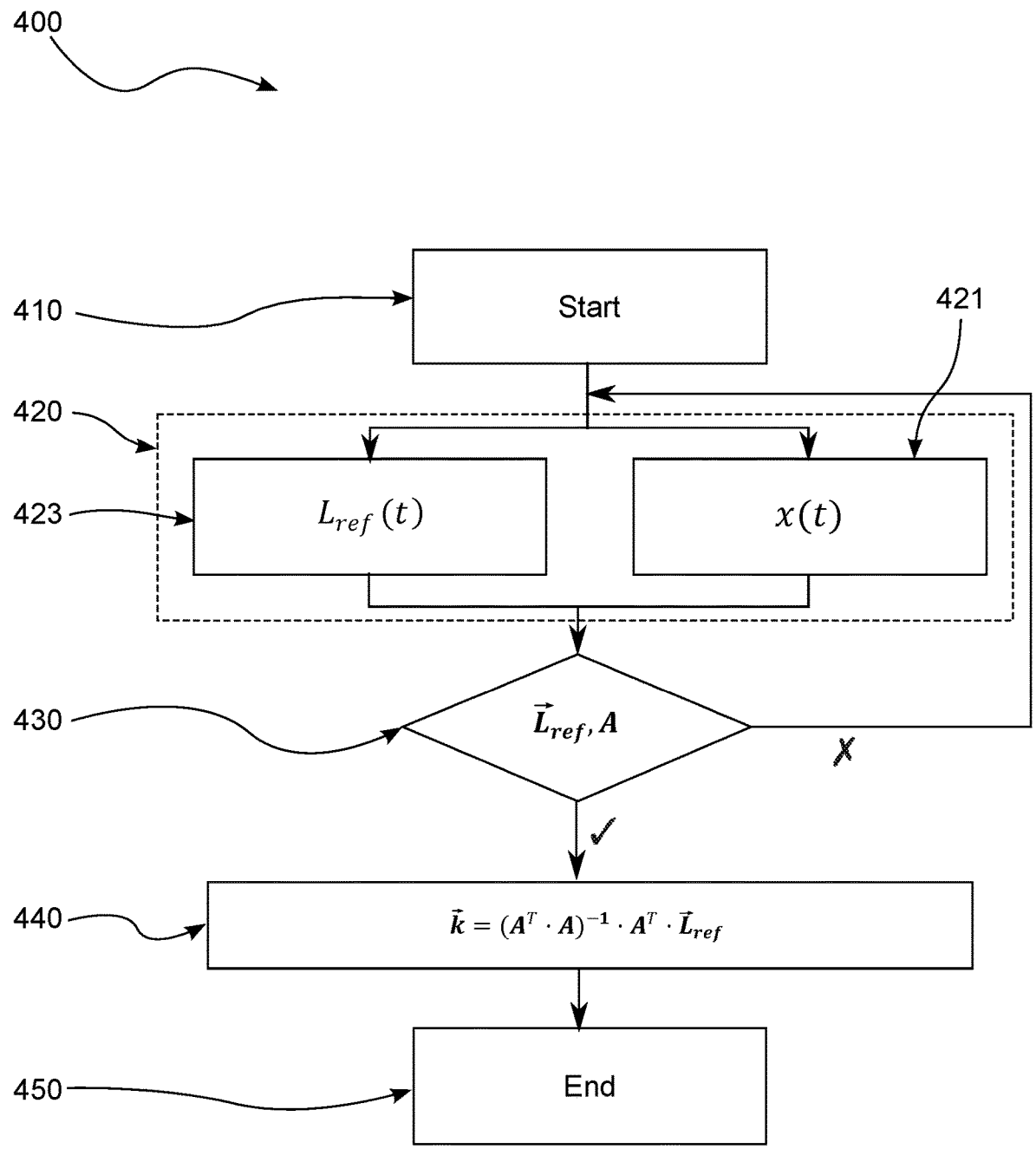
FIG. 4 shows a flow diagram for a method.

FIG. 4 shows a method 400 for parameterizing the sensor arrangement 310.

In the starting block 410, the parameterization is initiated. The parameterization is preferably initiated whenever enough wind is blowing for the rotor of the wind power installation to turn, but the wind speed is so low that only stresses that are caused by gravitation are taken into consideration, but further stresses can be ignored. The bending moments occurring consequently result from a dead weight of the rotor blade.

An acquisition step 420 is then carried out at time step $t=t_1$. In the acquisition step 420, a sensor variable $x_1(t=t_1)$, $x_2(t=t_1)$, $x_3(t=t_1)$ is acquired for each load sensor 311, 313, 315 in a sensor-variable-set determining step. The sensor variables $x_1(t=t_1)$, $x_2(t=t_1)$, $x_3(t=t_1)$ of all the load sensors 311, 313, 315 together form the set of sensor variables at time step $t=t_1$.

Also carried out in the acquisition step 420 is a reference-load-variable determining step 423. In this, a reference load variable $L_{ref}(t=t_1)$ is determined. The reference load variable $L_{ref}(t=t_1)$ corresponds here to the load variable that is likely to occur at time step $t=t_1$ and can be calculated by using the weight force.

The reference load variable $L_{ref}$ is for example a bending moment $M_x$ in the flapwise direction x, a bending moment $M_y$ in the edgewise direction y or an axial force $F_z$ in the longitudinal direction z. In the reference-load-variable determining step 423, however, it is also possible for multiple reference load variables to be determined.

In the storage step 430, the reference load variable $L_{ref}(t=t_1)$ is stored in an output vector $\vec{L}_{ref}$. Similarly, the set of sensor variables, that is to say the sensor variables $x_1(t=t_1)$, $x_2(t=t_1)$, $x_3(t=t_1)$, is stored in a measurement matrix A.

As soon as enough data have been stored, particularly after a predetermined number of repetitions, the procedure continues with a parameterizing step 440. Otherwise, a further acquisition step 420 is carried out in the next time step. In this case, with each new acquisition step an operational situation of the wind power installation is varied. By changing the operational situation, it is intended that the reference load variable to be determined changes. In particular, this may mean that the rotor has continued to turn. The turning of the rotor has the effect that the gravitational force leads to a changed strain of the rotor blade in the region of the load sensors. Consequently, the reference load variable $L_{ref}$ also changes.

The operational situation may however also be varied by for example a blade angle of the rotor blade being changed. Furthermore, an operational setting may also be changed. The changing of the operational setting is likewise intended to have the effect of changing the reference load variable. However, the operational setting does not have to be varied after each acquisition step 420, but instead may be retained for multiple acquisition steps 420. Consequently, for example, the continued turning of the rotor does not represent a changed operational setting, but leads to a changed operational situation. The operational setting can however be changed by variation of the blade angle.

In the acquisition step 420, the set of sensor variables and the reference load are then repeatedly acquired in changed operational situations. This takes place in the sensor-variable-set determining step 421 and in the reference-load-variable determining step 423. Operational settings may possibly also be varied. The variables thus acquired are stored in the storage step 430, in the next row of the output vector or the measurement matrix in each case.

After p acquisition steps 420 and storage steps 430, there is consequently a measurement matrix:

$$A = \begin{pmatrix} x_1(t=t_1) & x_2(t=t_1) & x_3(t=t_1) & 1 \\ x_1(t=t_2) & x_2(t=t_2) & x_3(t=t_3) & 1 \\ \ldots & \ldots & \ldots & 1 \\ x_1(t=t_p) & x_2(t=t_p) & x_3(t=t_p) & 1 \end{pmatrix}$$

and also an output vector:

$$\vec{L} = \begin{pmatrix} L_{ref}(t=t_1) \\ L_{ref}(t=t_2) \\ \ldots \\ L_{ref}(t=t_p) \end{pmatrix}.$$

A schedule is preferably used as a basis here, so that in the storage step 430 enough data have been stored specifically when the schedule has been ended. Consequently, the number p of acquisition steps may be prescribed in the schedule.

It may for example be prescribed according to the schedule to carry out an acquisition step 420 after each turning of the rotor by 1° and to change the blade angle after two full turns, while for example three different blade angles are measured. The number p of acquisition steps would in this case be 2*3*360=2160.

Once the schedule has been ended, the sensor arrangement is parameterized in the parameterizing step 440 in that the calculation parameters are determined.

In this case, the calculation parameters are determined on the basis of the measurement matrix A, while at the same time taking into consideration all the sensor variables acquired during the parameterization. In just one computing step, the parameter vector $\vec{k}$, which has the calculation parameters, is determined for this purpose by using:

$$\vec{k} = (A^T \cdot A)^{-1} \cdot A^T \cdot \vec{L}_{ref}.$$

In the subsequent completion step 450, the calculated parameters are stored and the parameterization is ended.

If the sensor arrangement is parameterized for a bending moment $M_x$ in the flapwise direction x, the calculation parameters $k_{x,1}$, $k_{x,2}$, $k_{x,3}$, $k_{x,0}$ are correspondingly determined and stored.

Once parameterization has taken place, the sensor arrangement may be used for calculating load variables. Therefore, once the parameterization for the bending moment $M_x$ has been carried out, the calculation takes place on the basis of the overall calculation rule:

$$M_x = k_{x,1} \cdot x_1 + k_{x,2} \cdot x_2 + k_{x,3} \cdot x_3 + k_{x,0}.$$

To ensure the most accurately determined calculation parameters possible, the method 400 for parameterizing the sensor arrangement 310 is repeated after a predetermined time, for example every three months.

The following has particularly also been recognized and the following is proposed.

A method for parameterization of a sensor arrangement of a wind power installation is therefore proposed, the sensor arrangement being arranged on a rotor blade of the wind power installation and consisting of at least three load sensors.

The parameterization in this case preferably takes place in a two-stage process, consisting of a schedule or parameterizing routine and a parameterizing step.

The aim of the parameterizing routine is to acquire and store measured values of the load sensors respectively under different bending moments on the rotor blade and in each case an associated calculated reference bending moment. For this, the wind power installation is operated in a mode in which a bending moment applied to the rotor blade can be calculated with great accuracy.

It is particularly proposed for the parameterizing routine to operate the wind power installation in an idling mode and to prescribe varying blade angles for the rotor blade, so that the reference bending moment corresponds approximately to a natural moment.

In order that the aerodynamic forces are negligible, the parameterization of the sensor arrangement is preferably performed at low wind speeds. On the other hand, the wind must be strong enough to carry out the parameterization in an acceptable time. The specific wind speeds at which such a parameterization is carried out are dependent on the cut-in wind speed of the wind power installation at the respective site. If these conditions are not satisfied, particularly if the wind is stronger than in good conditions, but a parameterization is necessary, the parameterization is nevertheless carried out and is repeated later in good conditions.

Alternatively, the aerodynamic forces and moments could be additionally taken into consideration, in order to make an accurate parameterization of the sensor arrangement also possible when there is a lot of wind.

Once the parameterizing routine has been completed, the parameterizing step is performed. The parameterizing step serves for calculating the calculation parameters. After completion of the parameterizing routine, the calculation parameters are calculated from the recorded sensor variables and the reference bending moments, so that the mean squared error between the reference bending moments and the bending moments calculated from the calculation parameters and the sensor variables is minimal.

It is assumed here that the bending moments are proportional to the strain of the rotor blade. In fact, as from a certain strain, a non-linearity occurs. The deviation from the linearity can, if need be, be taken into consideration inversely in the parameterizing routine or in the parameterizing step.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
   parameterizing a sensor arrangement comprising a plurality of load sensors of a rotor blade of a rotor of a wind power installation for acquiring at least one load variable, wherein the at least one load variable is representative of a load acting on the rotor blade, wherein the rotor blade has at least three load sensors, the parameterizing comprising:
   recording, by each of the load sensors, a load-dependent physical variable of the rotor blade, and outputting a variable indicative of the load-dependent physical variable as the acquired sensor variable,
   calculating the at least one load variable from the sensor variables, wherein at least one overall calculation rule is used, forming a relationship between the acquired sensor variables of all the load sensors and the at least one load variable of the rotor blade, and having a plurality of calculation parameters, and
   parameterizing the sensor arrangement, wherein the calculation parameters of the overall calculation rule are determined while at the same time taking into consideration acquired sensor variables of all the load sensors, and adjusting operation of the rotor blade of the rotor of the wind power installation based on readings of the parameterized load sensors.

2. The method as claimed in claim 1, wherein no individual parameterization of individual load sensors takes place for determining the calculation parameters.

3. The method as claimed in claim 1, wherein the sensor variables are successively acquired in a plurality of acquisition steps in varying operational situations of the wind power installation, wherein in each acquisition step:
a sensor variable is respectively acquired for each load sensor, so that multiple sensor variables are acquired in the acquisition step, forming a set of sensor variables, and
at least one associated load variable is ascertained for the set of sensor variables as a reference load variable,
wherein the acquisition steps are respectively repeated with a changed operational situation at least as often as the overall calculation rule has calculation parameters to be determined, and
wherein the calculation parameters are determined in dependence on all the sensor variables acquired in the acquisition steps and ascertained associated load variables.

4. The method as claimed in claim 1, wherein the overall calculation rule has or is a calculation equation, which describes by the calculation parameters a relationship between the load variable and the sensor variables, wherein, for determining the calculation parameters,
a system of equations comprising multiple calculation equations is set up,
for each calculation equation of the system of equations:
an ascertained reference load variable is used for the load variable, and
acquired sensor variables associated with the ascertained reference load variable are used for the sensor variables, and
the system of equations is resolved based on the calculation parameters.

5. The method as claimed in claim 1, wherein:
for the successive acquisition of the sensor variables in varying operational situations,
the operational situations are chosen such that different load variables including different bending moments, occur at the rotor blade, and wherein:
the bending moments result from a dead weight of the rotor blade, and
the bending moments are varied by the rotor being changed in its rotational position, and/or a blade angle of the rotor blade being changed.

6. The method as claimed in claim 1, wherein:
for the successive acquisition of the sensor variables in varying operational situations in acquisition steps,
a schedule is prescribed for the acquisition steps,
the varying operational situations are set according to the schedule, and
the parameterizing of the sensor arrangement is carried out after ending the schedule.

7. The method as claimed in claim 1, wherein, for acquiring the sensor variables, at least one operational setting is provided from the list comprising:
the wind power installation is operated in an idling mode,
a blade angle of the rotor blade is set,
a power output is set,
a torque of a generator connected to the rotor is set, and
a rotational speed of the rotor is set,
wherein for acquiring the sensor variables, at least one of the operational settings is varied.

8. The method as claimed in claim 1, wherein:
the acquisition of the sensor variables for parameterizing the sensor arrangement takes place at wind speeds in a first wind speed range and a second wind speed range,
the first wind speed range lies between a start-up wind speed and a first wind speed, which is greater than the start-up wind speed,
the second wind speed range lies between the first wind speed and a second wind speed, which is greater than the first wind speed, and
the acquisition is repeated at wind speeds in the first wind speed range if the acquisition previously took place at wind speeds in the second wind speed range.

9. The method as claimed in claim 1, wherein:
the sensor arrangement is set up for acquiring at least two load variables,
a dedicated overall calculation rule with dedicated calculation parameters is provided for each load variable, and wherein:
one of the load variables is a blade bending moment of the rotor blade in a flapwise direction, and
one of the load variables is a blade bending moment of the rotor blade in an edgewise direction, and
one of the load variables is an axial force of the rotor blade, and wherein,
for each load variable,
a dedicated overall calculation rule, with dedicated calculation parameters, is used, in order to calculate the respective load variable from the sensor variables, and
the calculation parameters of each overall calculation rule are respectively determined while at the same time taking acquired sensor variables of all the load sensors into consideration.

10. The method as claimed in claim 1, wherein for the successive acquisition of the sensor variables in varying operational situations in acquisition steps, the reference load variable is additionally ascertained in each acquisition step in dependence on aerodynamic forces occurring and/or aerodynamic moments occurring, which act on the rotor blade.

11. The method as claimed in claim 1, wherein:
a non-linear relationship between the sensor variables and the load variable is taken into consideration
the calculation parameters comprise the offset $k_0$,
altogether m calculation parameters $k_{i,j}$ are assigned to each load sensor, where m is greater than one, and
the overall calculation rule in the case of n load sensors for the load variable L is obtained as:

$$L = \sum_{i=1}^{n}\left(\sum_{j=1}^{m} k_{i,j} \cdot x_i^j\right) + k_0.$$

12. The method as claimed in claim 1, wherein no individual calibration and/or adjustment of individual load sensors takes place for determining the calculation parameters.

13. The method as claimed in claim 4, wherein more calculation equations are set up than the overall calculation rule has calculation parameters, so that the system of equations is overdetermined, and the system of equations is resolved such that a statistically optimal solution is obtained.

14. The method as claimed in claim 1, wherein:
a system of equations comprising a plurality of calculation equations of the overall calculation rule is set up in matrix form, wherein:
an output vector for the ascertained reference load variables, a measurement matrix for the acquired sensor variables and a parameter vector for the calculation parameters to be determined such that the output vector is equal to a product of the measurement matrix times the parameter vector.

15. The method as claimed in claim 7, wherein:
each operational setting is retained for a predetermined test period for a plurality of acquisition steps and/or at least one operational setting is retained until multiple operational situations are in each case enacted, with an acquisition step for acquiring the sensor variables being respectively carried out.

16. The method as claimed in claim 9, wherein for determining the calculation parameters:
a measurement matrix comprising acquired sensor variables for all the overall calculation rules together is recorded and used, and
a dedicated output vector comprising ascertained reference load variables is used for each overall calculation rule.

17. The method as claimed in claim 14, wherein:
an approximation solution for the system of equations is found by forming a pseudoinverse of the measurement matrix, and/or
the parameter vector has an offset, and the measurement matrix has an additional column corresponding to the offset, which is filled with the value 1, so that, in the multiplication of the measurement matrix by the parameter vector, the offset is respectively multiplied by the value 1.

18. The method as claimed in claim 1, wherein:
the calculation parameters comprise an offset $k_0$,
each load sensor is assigned at least one calculation parameter $k_i$, and
the overall calculation rule is obtained in that:
for each of the load sensors, a product of the sensor variable $x_i$ of the respective load sensor i times the at least one calculation parameter $k_i$ associated with the load sensor is formed, and
the load variable L is obtained as the sum of the products $k_i \cdot x_i$ and the offset $k_0$ based on the formula:

$$L = \sum_{i=1}^{n} k_i \cdot x_i + k_0.$$

19. The method as claimed in claim 1, wherein in each acquisition step a reference load variable is calculated in dependence on a gravitational force that is acting on the rotor blade for each load sensor, wherein the gravitational force is converted into a coordinate system of the rotor blade while taking into consideration a blade angle of the rotor blade, a rotational position of the rotor, an angle of inclination of the rotor with respect to a horizontal, and/or an angle of inclination of the rotor blade with respect to a rotational plane of the rotor.

20. A wind power installation comprising:
a sensor arrangement comprising a plurality of load sensors of a rotor blade of a rotor of the wind power installation for acquiring at least one load variable, which is representative of a load that acts on the rotor blade,
wherein the rotor blade has at least three load sensors,
wherein each of the load sensors records a load-dependent physical variable of the rotor blade and outputs a variable representative thereof as the acquired sensor variable,
wherein the wind power installation has a control device, and
wherein the control device is configured to parameterize the sensor arrangement according to the method as claimed in claim 1.

* * * * *